F. W. PARSONS.
FEEDING MECHANISM FOR METAL WORKING MACHINES.
APPLICATION FILED FEB. 28, 1919.
1,389,975.
Patented Sept. 6, 1921.
2 SHEETS—SHEET 1.
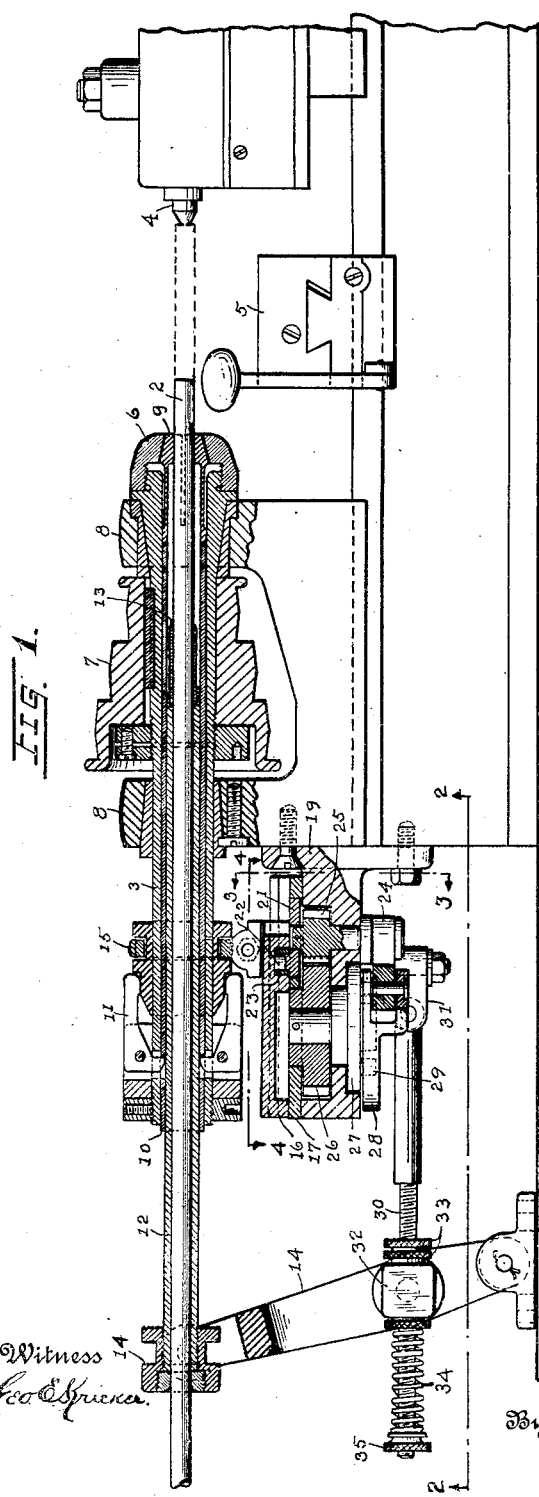
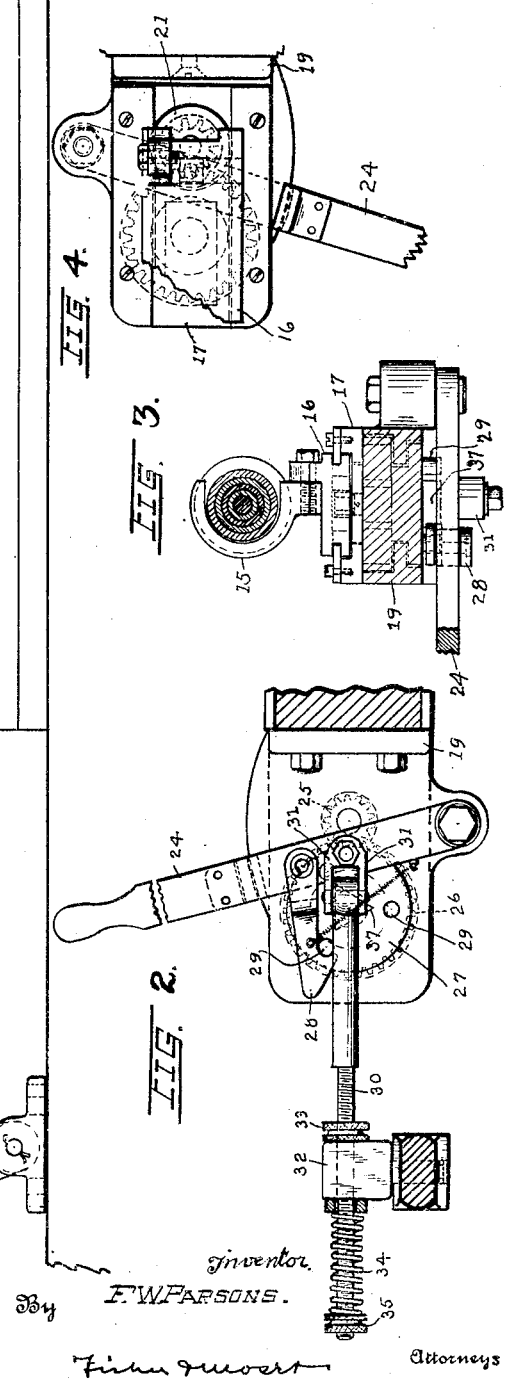
Witness
Geo. E. Spicker
Inventor
F. W. Parsons.
By Fisher Quoert
Attorneys F. W. PARSONS.
FEEDING MECHANISM FOR METAL WORKING MACHINES.
APPLICATION FILED FEB. 28, 1919.
1,389,975.
Patented Sept. 6, 1921.
2 SHEETS—SHEET 2.
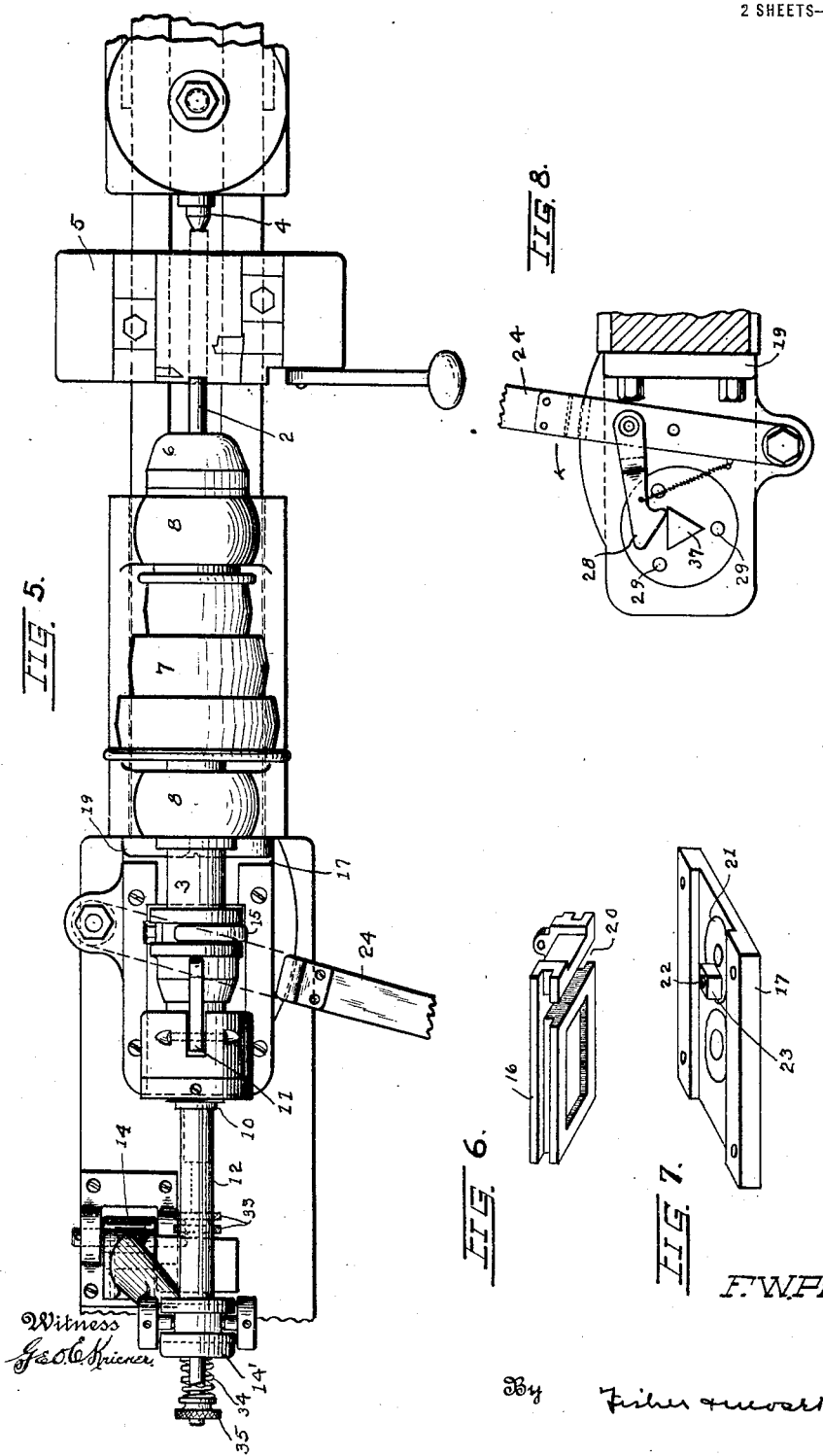
Inventor
F. W. PARSONS.

UNITED STATES PATENT OFFICE.

FREDERICK W. PARSONS, OF CLEVELAND, OHIO.

FEEDING MECHANISM FOR METAL-WORKING MACHINES.

1,389,975.         Specification of Letters Patent.     Patented Sept. 6, 1921.

Application filed February 28, 1919. Serial No. 279,804.

*To all whom it may concern:*

Be it known that FREDERICK W. PARSONS, citizen of the United States, residing at Cleveland, in the county of Cuyahoga and State of Ohio, has invented certain new and useful Improvements in Feeding Mechanism for Metal-Working Machines, of which the following is a specification.

This invention pertains to metal-working machinery wherein the stock or work is fed through a chuck or holder preliminary to each operation, and the primary object of the invention is to provide a quick and accurate mode of feeding the stock or work by a lever or other operating member which in one movement will first open the chuck, second, feed the stock through the chuck against a stop, third, hold the stock under continuous pressure against the stop, and fourth, close the chuck upon the stock.

In the accompanying drawings, Figure 1 is a side and sectional view of a portion of the feed end of a lathe, showing my improved feeding mechanism mounted thereon. Fig. 2 is a bottom view of the operating lever and associated parts, looking upward from line 2—2, Fig. 1. Fig. 3 is a transverse section on line 3—3, Fig. 1. Fig. 4 is a plan or top view of the slide for operating the clutch cone, looking downward from line 4—4, Fig. 1. Fig. 5 is a plan view of the mechanism shown in Fig. 1. Figs. 6 and 7 are perspective views of the slide and its guide plate, respectively. Fig. 8 is a bottom view of the operating lever and associated parts showing the lever and pawl as in returning.

In certain types of lathes and screw machines the stock or work is fed in the form of a rod 2 through a hollow arbor or shaft 3 against a stop or spindle 4 so that this rod may be cut or worked by tools engaged with or held within holders placed upon a cross slide 5 located at some intermediate point between stop 4 and a chuck having a conical head 6 on the inner end of the arbor. It is also customary to employ a cone pulley 7 between a pair of bearings 9 on the headstock to rotate the arbor, and the chuck includes a split spring collet 9 adapted to grip the rod 2, providing a longitudinally-movable sleeve 10 within the arbor is forced forward by a pair of pivoted bell-crank arms 11 and a slidable collar of cone shape mounted on the outer end of the arbor. A tube 12 slidably confined within sleeve 10 provides a holder for a feed shell 13 which is split or otherwise constructed to frictionally engage the stock or rod 2 and feed it forward any predetermined distance through and beyond the chuck when the chuck is open, and for this purpose the tube or holder 12 projects rearwardly from the arbor 3 and sleeve 10 where a forked rock-arm 14 is adapted to engage a grooved collar 14' fixed upon tube 12.

In operating the mechanism described according to the known practice, a double motion is necessary to open the chuck, feed the stock, lock the stock in the chuck, and return the feed shell for a second feeding operation, and in so doing the stock frequently rebounds and inaccurate results are obtained, or the extra care which must be exercised during such operations to obtain accurate results slows up the work and reduces the output per day.

However, I overcome the objections noted and achieve other satisfactory results by operating the same or similar mechanism by and with a new and novel construction of parts all substantially as hereinafter shown and described and more particularly pointed out in the claims.

Assuming the chuck 6 to be in a closed position and as holding the stock 2 against stop 4 in the turret or other support, the operator applies his tools and shapes or cuts the stock while it is under rotation. Where this work is to be duplicated repeatedly the projecting stock must be cut into exactly the same length at each operation. This demands that the stock be fed forward the same distance for each operation. The first requirement then is to open the chuck and release the rod after each operation. This is accomplished by sliding the cone-collar forwardly on the arbor, that is in a direction away from the bell-crank fingers so that the end pressure imparted to the inner sleeve 10 may be relieved and the spring collet 9 of the chuck permitted to release its grip on the stock. The forward movement of the cone-collar is obtained by a curved finger —15— engaged within an annular groove in said collar, and this finger is carried by a channeled slide member 16 adapted to reciprocate over the top of a guide-plate 17 fixed upon an arm or bracket 19 bolted to or forming an integral part of the frame or head of the machine.

Reciprocation of slide member 16 together with the finger and the cone-collar, is effected by an eccentric or rotatable disk 21 having a short wrist pin 22 projecting upwardly therefrom at one side of its axis. Disk 21 is inset within plate 17, and its eccentric pin 21 is rotatably engaged with a flat-sided block 23 which is confined within and adapted to travel back and forth within a transverse slot 20 in the bottom of slide member 16 during each complete rotary movement of disk 21. Thus, one-half of a revolution of the disk will carry the slide member forward and open chuck 6, and the continuing other half of revolution will reverse the direction of movement of the slide member and return it to the place of beginning, thereby closing the chuck. It is during this interval of revolution of the disk that feeding of the stock 2 occurs, and to feed the stock a constant end pressure is brought to bear upon the stock coincidently with the revolution of the disk. That is to say the feed shell is pressed inward just as soon as the chuck releases its grip, and the pressure is maintained until the stock is moved forwardly against the stop and not discontinued until the chuck is again closed. This involves a full longitudinal movement forwardly of the feed shell, while the cone-collar is traveling forward on the arbor and also back again to the place of beginning, and the feed shell and cone-collar are operated conjointly in the present invention by a single lever 24 having operating connections with both the feed shell and the eccentric disk 21. Thus, the eccentric disk is pinned or otherwise secured to the shaft of a pinion 25 seated in mesh with a larger spur gear 26 within a recess in arm or bracket —19—. Spur gear 26 is pinned or otherwise fastened to the stub shaft of a ratchet wheel 27 exposed at the bottom of the bracket where a spring-pulled pawl 28 on lever 24 is adapted to engage one of the three pins or projections 29 on the wheel upon each draw movement forwardly of the lever. This single movement of the lever carried to its maximum will rotate the large gear partially and cause the pinion and eccentric disk 21 to make a complete revolution, thereby moving the slide member and the cone-collar forward and back to open and close the chuck. The same movement of the lever will carry the feed shell forward to any degree or position as predetermined by adjustment of the throw of rock arm 14 which is coupled to the lever by a screw-threaded rod 30. This rod has a universal joint connection 31 with the lever to permit the lever to oscillate in a horizontal plane while the rock arm oscillates in a vertical plane, and the screw-threaded part of the rod is free to slide within limits through the swivel block 32 carried at one side of rock arm 14. The stop limits are defined by the stop and lock nuts 33 at the front side of the block and by the coiled spring 34 and adjustable thumbnut 35 at the outer end of the rod. With this arrangement of spring and lock nuts the compression of the spring may be varied in different locations of travel of rock arm 14, and by a proper setting of the nuts a shorter or longer feed of the stock may be obtained and it is possible to regulate the stroke or length of movement of the stock or rod through the chuck relatively to the stop while locking up the chuck. Further, the compression of the spring in the forward movement of the operating lever will hold the stock or rod against the stop and makes rebound of the stock impossible.

One stroke of the operating lever will open the chuck and feed the stock a predetermined distance against the stop without rebound and then lock the chuck. The return stroke of the lever is idle, except that the feed shell is carried back by the return movement of the rock arm and its connecting rod to the predetermined point where a new grip is to be taken on the stock. The gears and eccentric disk remain at rest during the return stroke of the lever inasmuch as the pawl disengages itself from one ratchet wheel pin on its return movement to engage another, and in returning the pawl is guided to the next pin by a triangular projection 37 on the bottom side of the ratchet wheel.

What I claim is:

1. In a metal-working machine, a work-holding chuck having a reciprocal operating member, a reciprocal work feeding member, a rotary device adapted to impart a full reciprocal movement to said chuck operating member, and means adapted to operate said work-feeding member and said rotary device conjointly.

2. In a metal-working machine, a work-holding chuck and a reciprocal operating member therefor, a reciprocal work-feeding device, a rotary element adapted to impart a full reciprocal movement to said chuck operating member, a lever having operating connection with said work-feeding device, and means operable upon one motion of said lever adapted to revolve said rotary element.

3. A metal-working machine having a work-holding chuck adapted to be opened and closed, a work-feeding device reciprocally related to said chuck, reciprocal and rotary means adapted to open and close said chuck, oscillatory means adapted to reciprocate said work-feeding device, and a common operating member for said rotary and oscillatory means.

4. In a metal-working machine, a work-holding chuck having a reciprocal operating member, a reciprocal work-feeding device having a rotatable eccentric connection adapted to reciprocate said device, and a lever having means connected therewith adapted to rotate said eccentric connection and to move said work-feeding device in one direction in one motion of said lever.

5. In a metal-working machine, a chuck, a reciprocal member controlling the opening and closing of the chuck, a reciprocal work-feeding device, means adapted to adjustably vary the feeding stroke of said device, revoluble mechanism adapted to reciprocate said chuck controlling member, means adapted to revolve said mechanism and reciprocate said work-feeding device conjointly, and means adapted to impart a yielding end pressure upon said work-feeding device.

6. In a metal-working machine, mechanism for controlling the feed of stock, comprising a reciprocable member, an eccentric engaged with said member, and means adapted to revolve said eccentric intermittently.

7. In a metal-working machine, a chuck, means for feeding stock through said chuck, a reciprocal device for controlling opening and closing of the chuck, a slidable member engaged with said device, an eccentric adapted to operate said slidable member, gears for said eccentric, ratchet mechanism for said gears, and a lever having operating connection with both said stock feeding means and said ratchet mechanism.

8. In a metal-working machine, a chuck, a work-feeding device, a reciprocal member for controlling the opening and closing of said chuck, rotary means adapted to reciprocate said member, an oscillatory lever adapted to rotate said means, and mechanism connected with said lever adapted to place said work-feeding device under yielding pressure during one movement of said lever.

9. In a metal-working machine, a chuck, a feed shell and a stop for the work, a reciprocal sleeve adapted to control opening and closing movements of the chuck, a shifting cone and pivoted, members adapted to actuate said sleeve, a slide adapted to shift said cone, an eccentric adapted to operate said slide, gears adapted to rotate said eccentric, an oscillatory lever and ratchet means adapted to revolve said gears, a rock arm adapted to reciprocate said feed shell, and a rod having a compression spring engaged with said arm and connected with said lever.

10. In a metal-working machine, means for feeding stock, comprising a feed shell, a rock arm adapted to reciprocate said feed-shell, an oscillatory lever having a rod in slidable connection with said arm, and a compression spring and adjustable stops on said rod adapted to actuate said rock arm.

11. In a metal-working machine, a chuck, a stop and a feed shell for the work, a reciprocal sleeve adapted to control the action of the chuck, a reciprocal cone-collar and bell-crank adapted to move said sleeve longitudinally, a slidable member in connection with said cone-collar, a rotatable eccentric engaged with said slidable member, a large and small spur gear adapted to rotate said eccentric, a ratchet wheel and a lever and pawl adapted to turn said large gear, a rock arm adapted to reciprocate said feed shell, a rod connected with said lever and slidably related to said rock-arm, an adjustable stop on said rod adapted to engage said rock-arm and carry it in one direction, and a compression spring and an adjustable tension device on said rod adapted to carry said rock-arm in the opposite direction.

Signed at Cleveland, in the county of Cuyahoga, and State of Ohio, this 20th day of February, 1919.

FREDERICK W. PARSONS.